(12) United States Patent
Hargreaves

(10) Patent No.: US 10,977,987 B2
(45) Date of Patent: Apr. 13, 2021

(54) DISPLAYS UTILIZING LEDS AS SENSING ELEMENTS

(71) Applicant: Synaptics Incorporated, San Jose, CA (US)

(72) Inventor: Kirk Hargreaves, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/271,050

(22) Filed: Feb. 8, 2019

(65) Prior Publication Data

US 2020/0258448 A1  Aug. 13, 2020

(51) Int. Cl.
*G06F 3/041* (2006.01)
*G09G 3/3208* (2016.01)
*G09G 3/32* (2016.01)
*G06K 9/00* (2006.01)

(52) U.S. Cl.
CPC ......... *G09G 3/3208* (2013.01); *G06K 9/0004* (2013.01); *G09G 3/32* (2013.01); *G09G 2360/14* (2013.01)

(58) Field of Classification Search
CPC ........................................................ G06F 3/04
See application file for complete search history.

(56) References Cited

U.S. PATENT DOCUMENTS

| 2006/0086896 | A1* | 4/2006 | Han | G06F 3/0421 |
| | | | | 250/221 |
| 2014/0027606 | A1* | 1/2014 | Raynor | G06F 3/0421 |
| | | | | 250/205 |
| 2018/0157351 | A1* | 6/2018 | Lee | G06F 3/0412 |

* cited by examiner

*Primary Examiner* — Joseph R Haley
(74) *Attorney, Agent, or Firm* — Leydig, Voit & Mayer, Ltd.

(57) ABSTRACT

Display systems, devices and methods that utilize one or more native display elements as photo-sensing elements to detect light. A display device includes a plurality of light-emitting diode (LED) pixel elements arranged in an array having a plurality of columns and a plurality of rows, and a control circuit configured to selectively activate a first LED pixel element to emit light, and simultaneously activate a second LED pixel element to detect light.

14 Claims, 14 Drawing Sheets

(a)

(b)

(a) 5 Transistors + 2 Capacitors (b) 5 Transistors + 1 Capacitor

DISPLAYS UTILIZING LEDS AS SENSING ELEMENTS

TECHNICAL FIELD

The present disclosure generally provides systems and methods for input sensing or imaging using native LED display elements as photo-sensing elements.

BACKGROUND

Display devices are widely used in a variety of electronic systems. Display devices typically include an active display region, often demarked by a surface, in which the display device displays visual content, typically using an array of display pixel elements. Some display devices may incorporate separate fingerprint sensors. Fingerprint sensors may be used to allow a user to provide user input to interact with the electronic system. Fingerprint sensors also typically include a sensing region in which the fingerprint sensor determines presence, location, motion, and/or features of a fingerprint or partial fingerprint. Fingerprint sensors may be used for purposes relating to user authentication or identification of a user.

A fingerprint sensor may thus be used to provide interfaces for the electronic system. For example, fingerprint sensors are often used as input devices for larger computing systems such as opaque touchpads and fingerprint readers integrated in or peripheral to notebook or desktop computers. Fingerprint sensors are also often used in smaller computing systems such as touch screens integrated in mobile devices such as smartphones and tablets.

SUMMARY

According to an embodiment, a method is provided for operating a display including a plurality of light-emitting diode (LED) pixel elements arranged in an array having a plurality of columns and a plurality of rows. The method may include selectively activating a first LED pixel element to emit light, and simultaneously activating a second LED pixel element to detect light, wherein the second LED pixel element may be in a same row as the first LED pixel element.

According to another embodiment, a display device is provided that includes a plurality of light-emitting diode (LED) pixel elements arranged in an array having a plurality of columns and a plurality of rows, a control circuit configured to selectively activate a first LED pixel element to emit light, and simultaneously activate a second LED pixel element to detect light, wherein the second LED pixel element is located in a same row as the first LED pixel element.

According to yet another embodiment, a non-transitory computer-readable medium having processor-executable instructions stored thereon is provided. The processor-executable instructions include instructions for performing the methods described herein, e.g., controlling operation of a display and display pixel elements as disclosed herein.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE SEVERAL VIEWS OF THE DRAWING(S)

The detailed description is described with reference to the accompanying figures. The use of the same reference numbers in different instances in the description and the figures may indicate similar or identical items.

Figure 6:
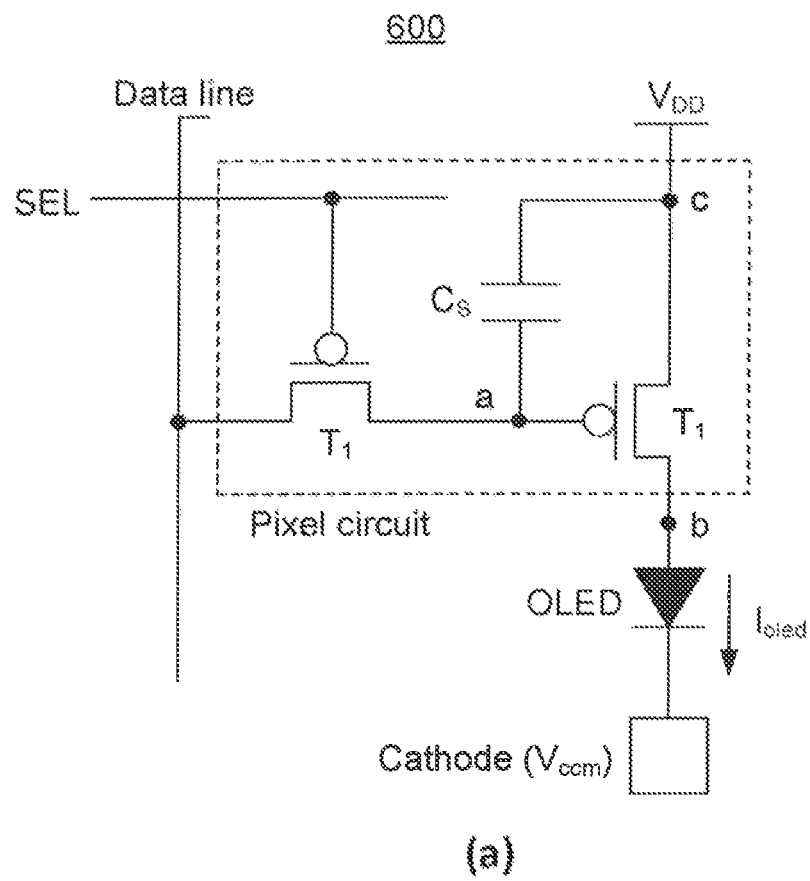
Figure 6:
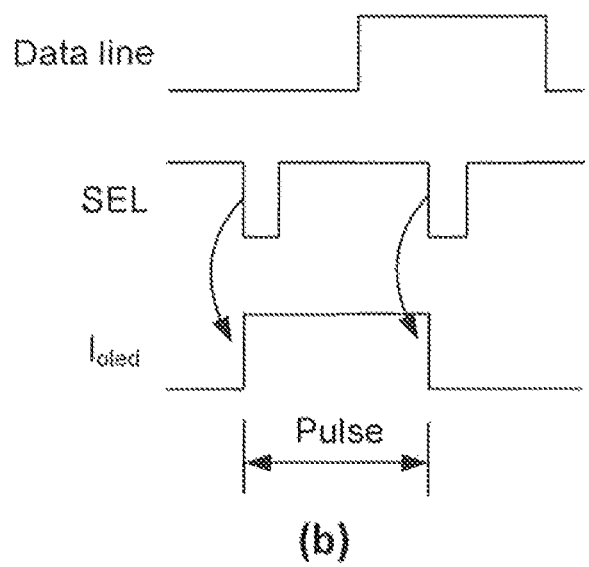

FIG. 6, panels (a) and (b), shows an example of a two-transistor, one capacitor (2T1C) LED or OLED pixel element according to an embodiment.

Figure 7:
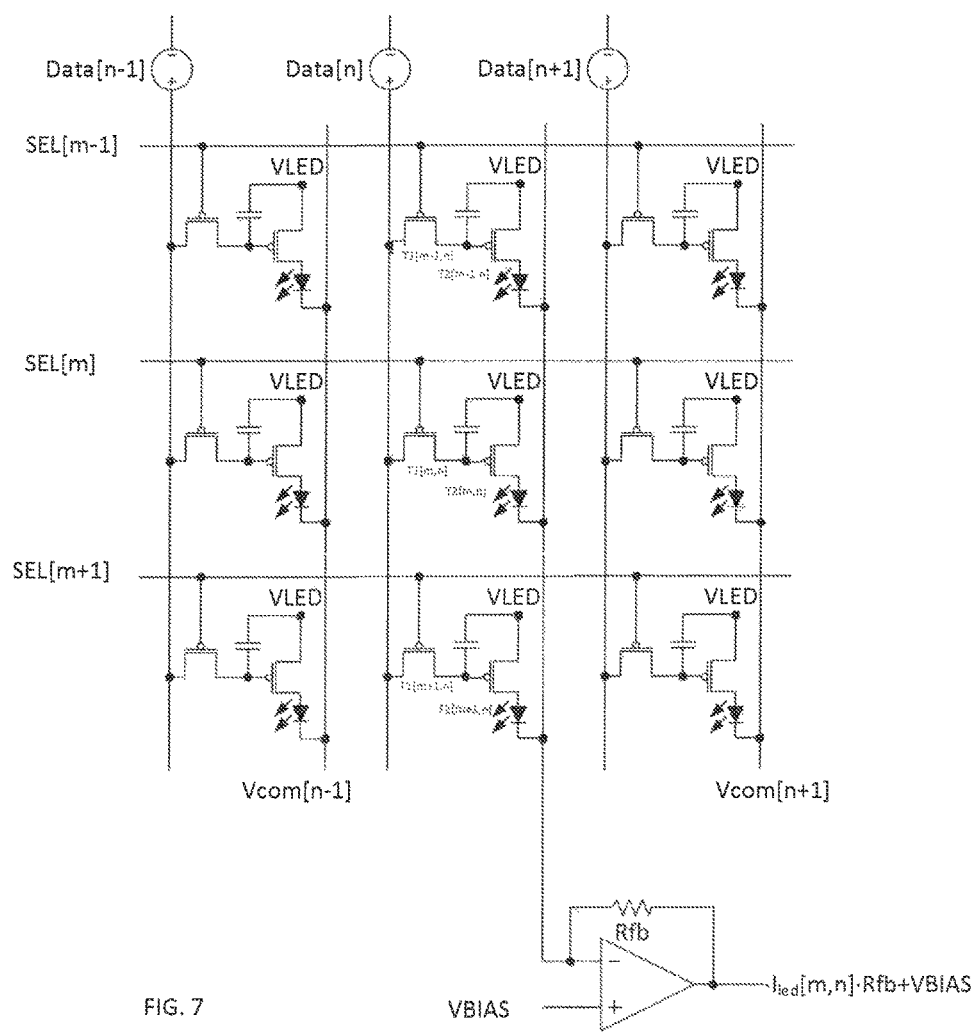

FIG. 7 is a circuit diagram embodiment including an array of 2T1C LED or OLED pixel elements shown in FIG. 6.

Figure 8:
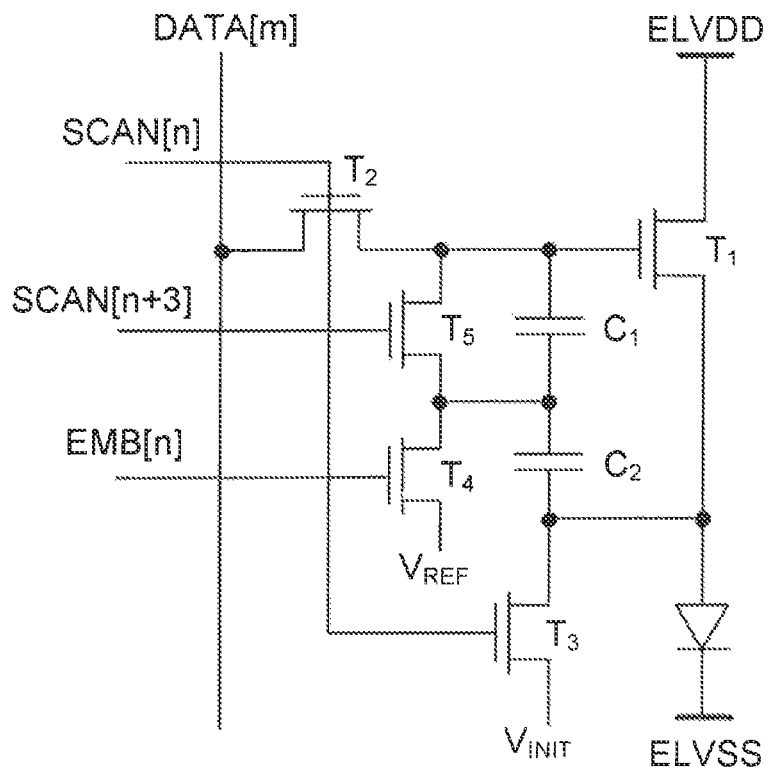
Figure 8:
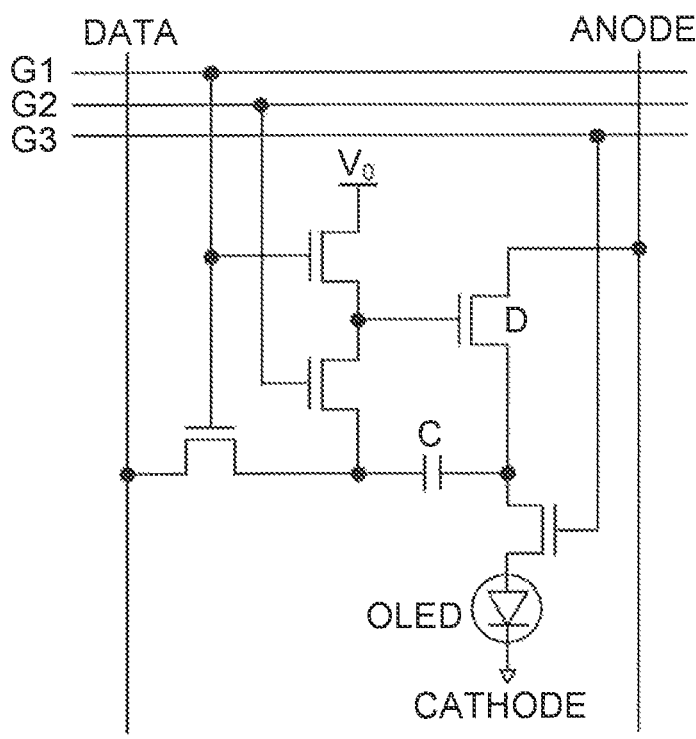

FIG. 8, panels (a) and (b), shows examples of two different TFT drive circuit configurations.

Figure 9:
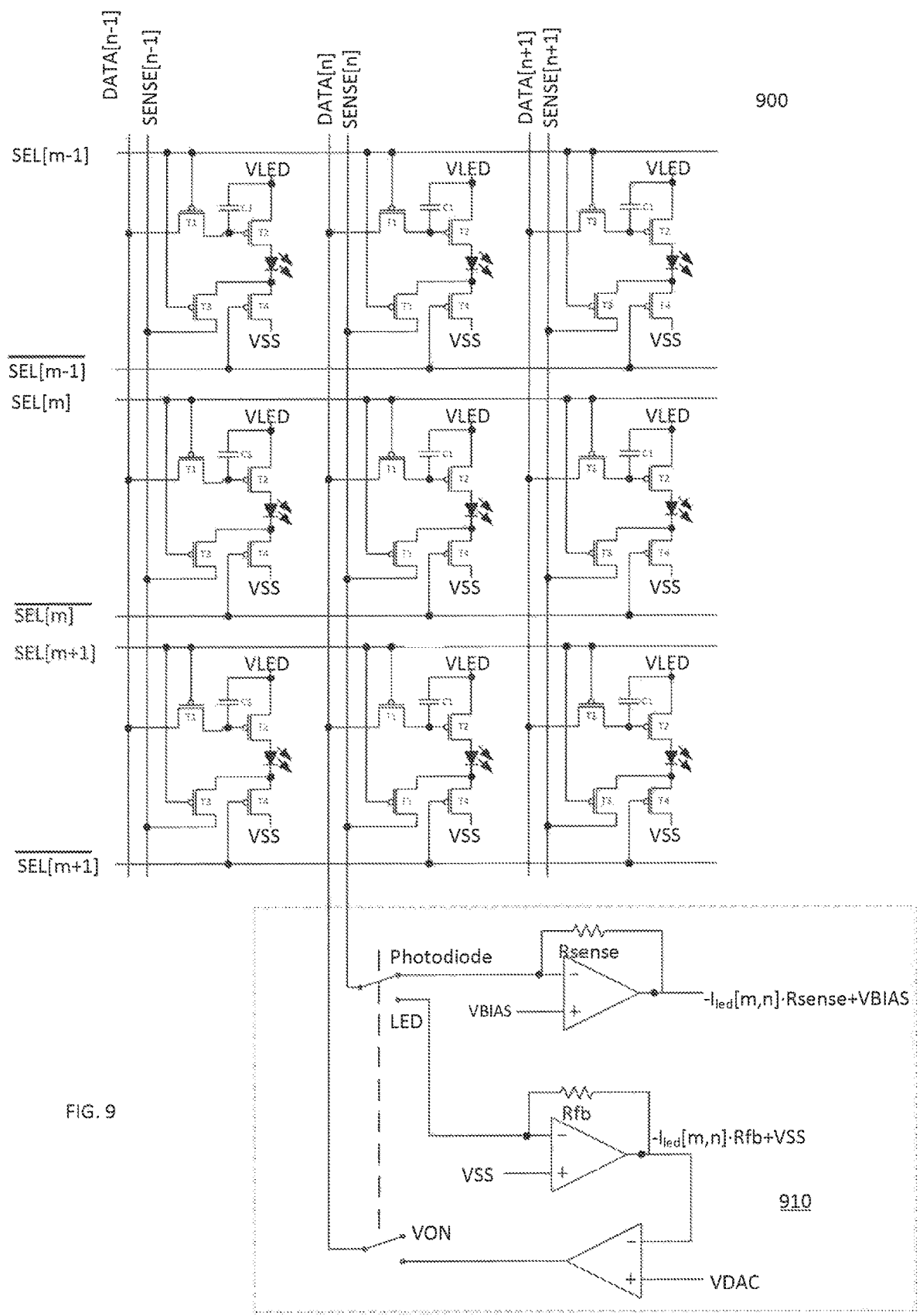

FIG. 9 illustrates a circuit embodiment configured to enable activation of one or more LED pixel elements in an emission state while one or more LED pixel elements operate in a photo-diode or photo-sensing state.

Figure 10:
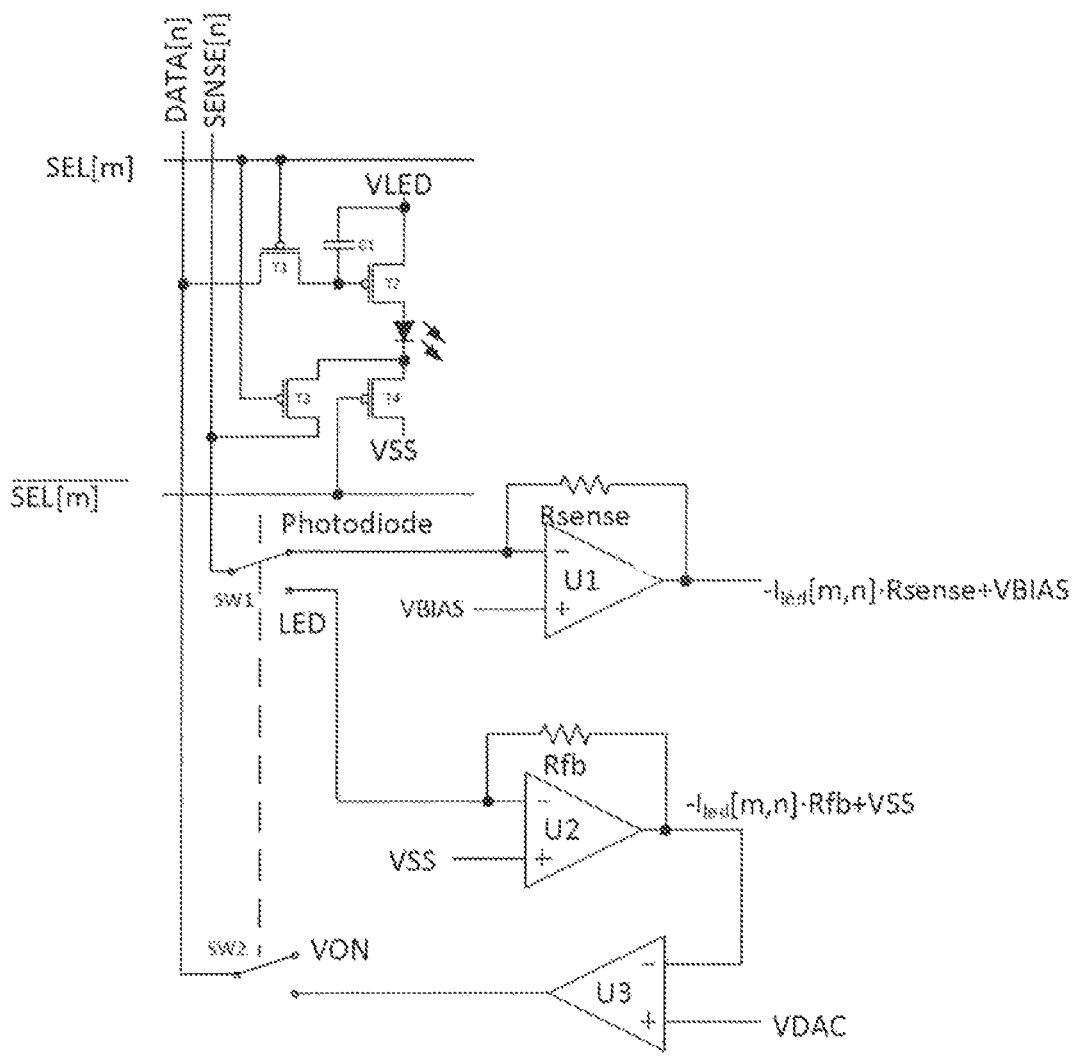

FIG. 10 shows a unit LED pixel element of FIG. 9 in detail.

Figure 11:
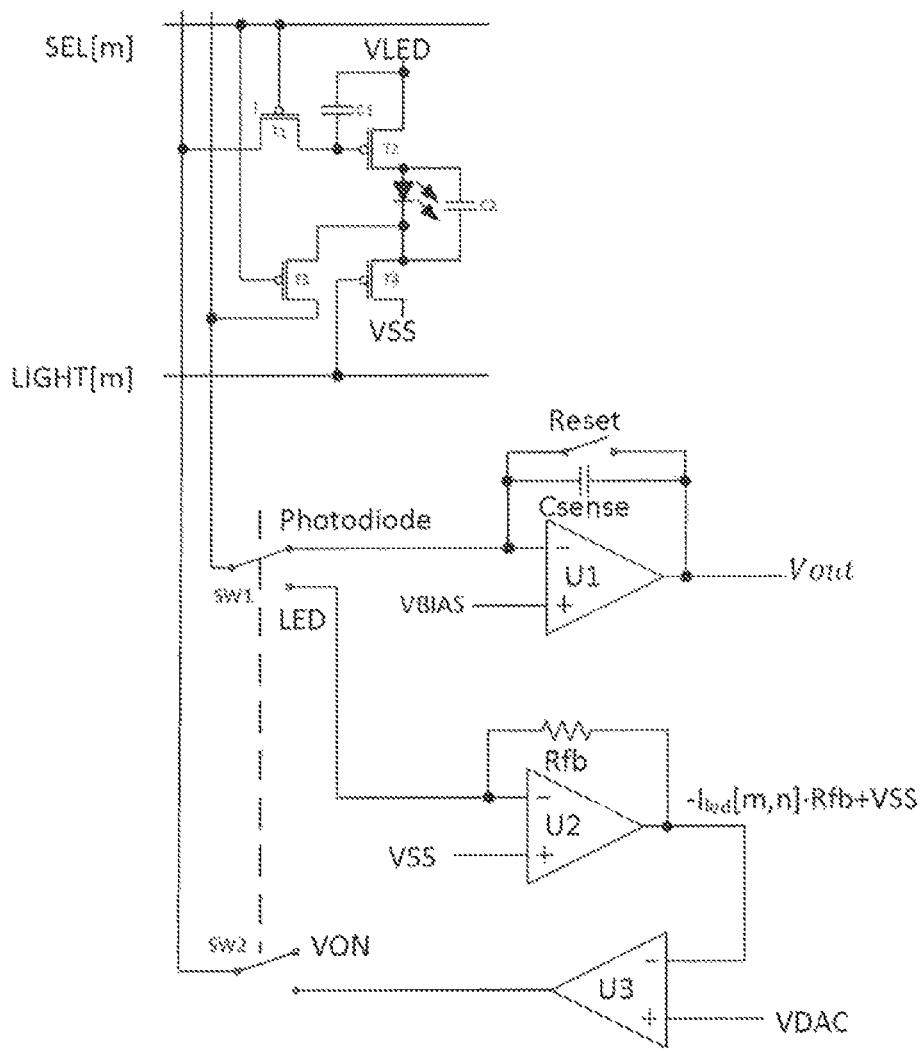

FIG. 11 illustrates a circuit embodiment configured to measure a photo-current from an LED using a capacitor charge/discharge technique.

Figure 12:
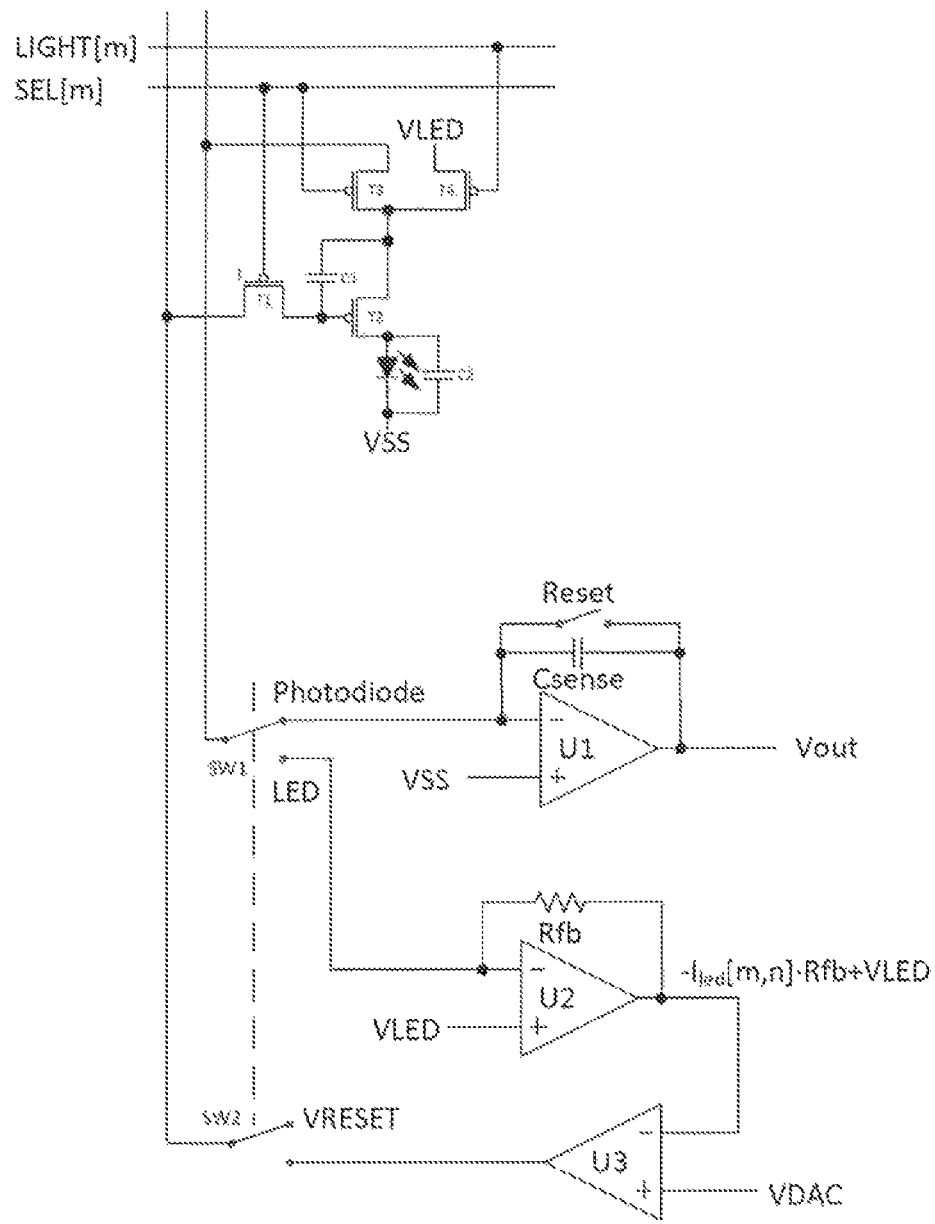

FIG. 12 illustrates a circuit embodiment that enables setting the LED light current and measuring the photo-charge on the high-side.

Figure 13:
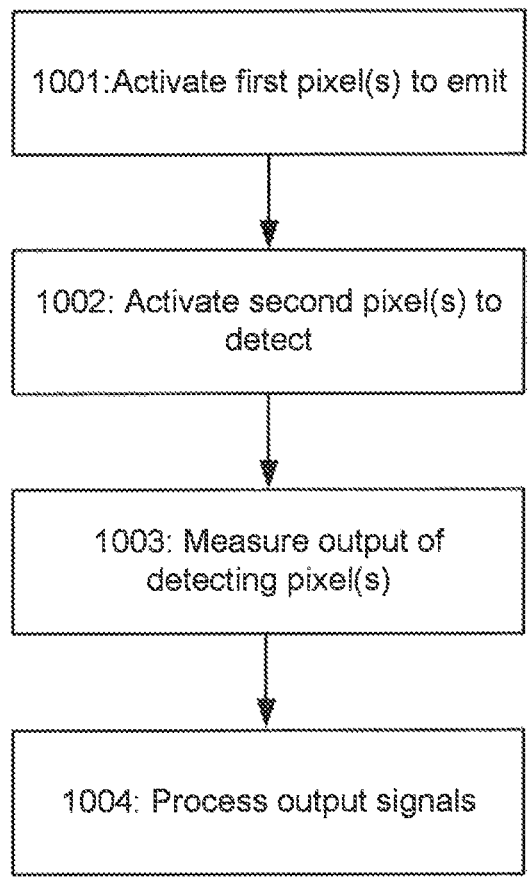

FIG. 13 illustrates a method of operating a display device according to an embodiment.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In one or more embodiments, display devices are configured to utilize native display pixel elements, e.g., native LED display pixel elements, as light sensing elements.

Figure 1:
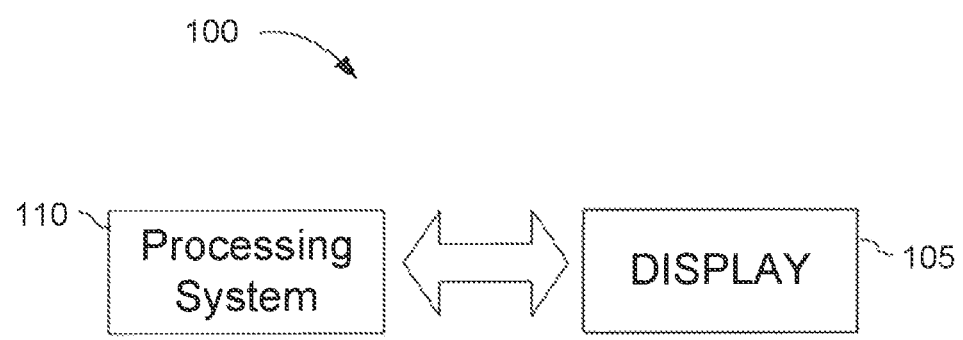
FIG. 1 is a block diagram depicting an example display device, according to one or more embodiments.

FIG. 1 is a block diagram depicting an example display device 100 according to one or more embodiments. The display device 100 may be configured to display content (e.g., images) provided by an electronic system (not shown for simplicity). The display device 100 may also be configured to provide input to the electronic system. As used in this document, the term "electronic system" or "electronic device" broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), televisions and smart televisions, and wearable computers such as smart watches and activity tracker devices). The electronic systems may include peripherals such as data input devices (including remote controls, keyboards and mice), and data output devices (including additional display screens, and printers). Other examples include remote terminals, kiosks, and video game machines (e.g., video game consoles, portable gaming devices, and the like), communication devices (including cellular phones, such as smart phones), and media devices (including recorders, editors, players, set-top boxes, music players, digital photo frames, and digital cameras). Additionally, the electronic system may be a host or a slave to the input device.

The display device 100 can be implemented as a physical part of the electronic system or can be physically separate from the electronic system. As appropriate, the display device 100 may communicate with parts of the electronic system using any one or more of the following: buses, networks, and other wired or wireless interconnections. Examples include Inter-Integrated Circuit (I²C), Serial Peripheral Interface (SPI), Personal System/2 (PS/2), Universal Serial Bus (USB), Bluetooth®, radio frequency (RF), and Infrared Data Association (IrDA).

In one or more embodiments, the display device 100 comprises one or more hardware display elements or pixel elements, for displaying images. Each pixel element may make up a single pixel or may be a sub-pixel of a single pixel. Pixel elements may comprise LED, μLED, or OLED pixel elements, as examples.

Referring back to FIG. 1 according to one or more embodiments, the display device 100 includes a processing system 110 as shown. The processing system 110 comprises parts of or all of one or more integrated circuits (ICs) and/or other circuitry components. The processing system 110 is coupled to a display 105 and is configured to provide input for displaying content in a display region using hardware display elements (e.g., pixel elements) of the display 105. For example, in an embodiment, the processing system 110 may comprise a DDIC (display driver integrated circuit) configured to provide drive signals to control the output of hardware display elements of the display 105.

The processing system 110 may include a non-transitory computer-readable medium having processor-executable instructions (such as firmware code, software code, and/or the like) stored thereon. The processing system 110 can be implemented as a physical part of the display 105 or can be physically separate from the display 105. Also, constituent components of the processing system 110 may be located together or may be located physically separate from each other. For example, the display device 100 may be a peripheral coupled to a computing device, and the processing system 110 may comprise software configured to run on a central processing unit of the computing device and one or more ICs (e.g., with associated firmware) separate from the central processing unit. As another example, the display device 100 may be physically integrated in a mobile device, and the processing system 110 may comprise circuits and firmware that are part of a main processor of the mobile device. The processing system 110 may be dedicated to implementing the display device 100, or may perform other functions, such as operating driving haptic actuators, etc.

In an embodiment as will be described below, the processing system 110 may operate one or more of the display element(s) of the display 105 of the display device 100 to operate in a photo-sensing state and produce electrical signals indicative of input (or lack of input) in a sensing region of the display 105. The processing system 110 may perform any appropriate amount of processing on the electrical signals in producing the information provided to the electronic system. For example, the processing system 110 may digitize analog electrical signals obtained from the display element(s). As another example, the processing system 110 may perform filtering or other signal conditioning. As yet further examples, the processing system 110 may determine positional information, recognize inputs as commands, recognize handwriting, match biometric samples, and the like.

The sensing region of the display 105 may overlap part or all of an active area of the display 105. The display 105 may be any suitable type of dynamic display capable of displaying a visual interface to a user, including an inorganic light-emitting diode (LED) display, organic LED (OLED) display, μLED display or other display technology. The display 105 may be flexible or rigid, and may be flat, curved, or have other geometries. The display 105 may include a glass or plastic substrate for thin-film transistor (TFT) circuitry, which may be used to address display pixels for providing visual information and/or providing other functionality. The display 105 may include a cover lens (sometimes referred to as a "cover glass") disposed above display circuitry and above inner layers of the display, and the cover lens may also provide an input surface for the display device 100. Examples of cover lens materials include optically clear amorphous solids, such as chemically hardened glass, and optically clear crystalline structures, such as sapphire. Some of the same electrical components may be utilized for both displaying visual information and for input sensing with the display device 100, such as using one or more display pixel elements for both display updating and input sensing. As another example, the display 105 may be operated in part or in total by the processing system 110.

Figure 2A:
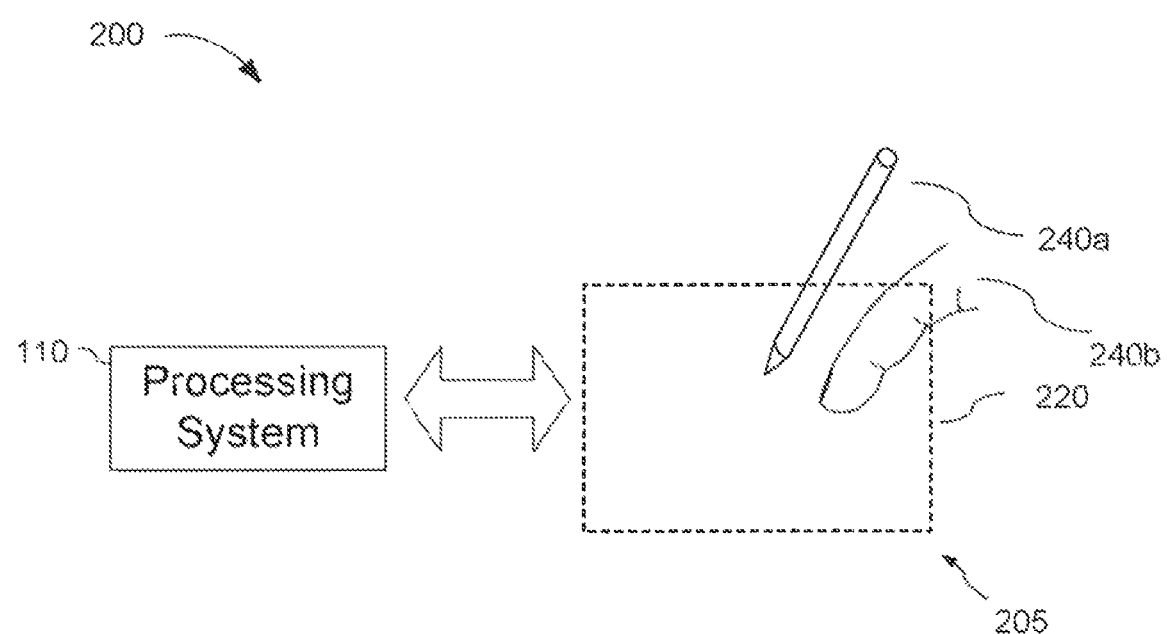
FIGS. 2A-2B are block diagrams depicting further example display devices, according to some embodiments.
Figure 2B:
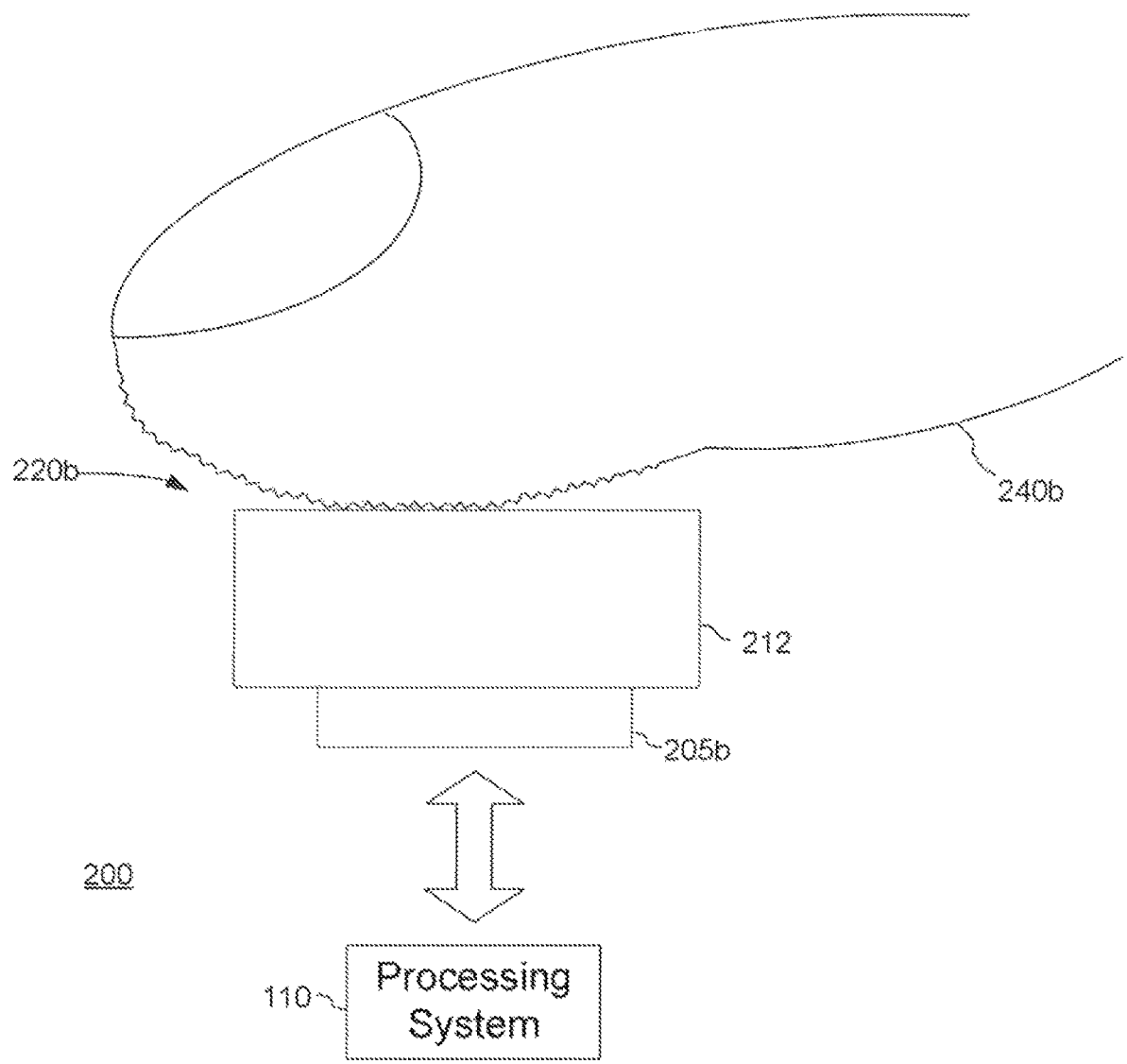

FIGS. 2A-2B are block diagrams depicting display devices according to some embodiments. In FIG. 2A, display device 200 is shown as including a sensing region 220 in display 205. The sensing regions may be of the same dimension as the display 205 as shown, or the sensing region 220 may include a sub-region, or multiple sub-regions of display 205. The sensing region 220 is configured to detect position information of an input object proximal to or in contact with the display 205, according to an embodiment. The input object may include a finger 240b or a stylus 240a, as shown in FIG. 2A. The sensing region 220 may include an input surface having a larger area than the input object. The sensing region 220 may include an array of dedicated sensing elements with a resolution configured to detect a location of a touch to the input surface. The dedicated sensing elements may also be configured to detect presence, force, and/or motion of an input object within the sensing region 220. The input object may include more than one object. In an embodiment, the sensing region 220 may be defined by, and comprise, all or a portion of the display pixel elements operating in a photo-sensing mode according to embodiments as will be discussed below. For example, one or more LED display elements may be configured to operate as light sensing elements for imaging applications.

In FIG. 2B, the display device 200 is shown as including a fingerprint sensor region 205b. The fingerprint sensor region 205b is configured to capture a fingerprint from a finger 240b. In one embodiment, the fingerprint sensor 205b defines a sensing region 220b on a surface of the cover layer 212 that provides an input surface for the fingerprint to be placed on or swiped over the fingerprint sensor region 205b. The sensing region 220b on the surface of the cover layer may include an area larger than, smaller than, or similar in size to a full fingerprint. The fingerprint sensor region 205b may have an array of dedicated sensing elements, or an array of native display pixel elements operating in a photo-sensing mode, with a resolution configured to detect surface variations of the finger 240b. For example, the fingerprint sensor region 205b may be defined by a dedicated sensor device disposed underneath the cover layer 212, or the fingerprint sensor region 205b may be defined by a subset of the full array of native display pixel elements, with the subset of display pixel elements operating in a photo-sensing mode as described herein. In an embodiment, the entire display, e.g., full array of display pixel elements, may operate as an imager, e.g., fingerprint sensor.

In certain embodiments, one or multiple native display pixels may be controlled to operate as photo-sensing pixels, e.g., as photo-diode or photo-sensing elements. For example, for LED displays, LED pixel elements may operate in a photo-sensing mode as described herein. For example, one or more LED pixel elements in an array of LED pixel elements may be activated to emit light, which may be useful in fingerprint sensing embodiments or other detection embodiments. Simultaneously, one or more other LED pixel elements may be activated to detect light, e.g., for use in sensing a fingerprint or other object proximal the display. In certain embodiments, a display controller provides appropriate drive and selection signals to the array of LED pixel elements to select which LED pixel element(s) are activated to emit light and which are activated to operate in a photo-sensing mode or state; measurement circuitry elements coupled with the array of LED pixel elements measure the signals output by the LED pixel elements operating in the photo-sensing state. The present embodiments are particularly useful as a fingerprint sensor, e.g., where a source of light approximating a point source may be used to illuminate the finger.

According to various embodiments, one or more native light emitting display pixel elements of a display are used as photo-diodes, e.g., in a photo-sensing state, to detect light. By using the display's native pixel elements (e.g., LED, OLED's or µLED elements) as photo-diodes, the need for a separate detector or imager is advantageously eliminated. Also, one or more objects or features, such as a finger print, can be detected or imaged anywhere on the display. For example, by selectively lighting up one or more surrounding LED's, one or more LED's being used as photo-diodes may be used to measure fingerprints and finger position. Certain embodiments advantageously enable use of displays as large array photo-imagers without having to insert dedicated photo-diodes.

Figure 3:
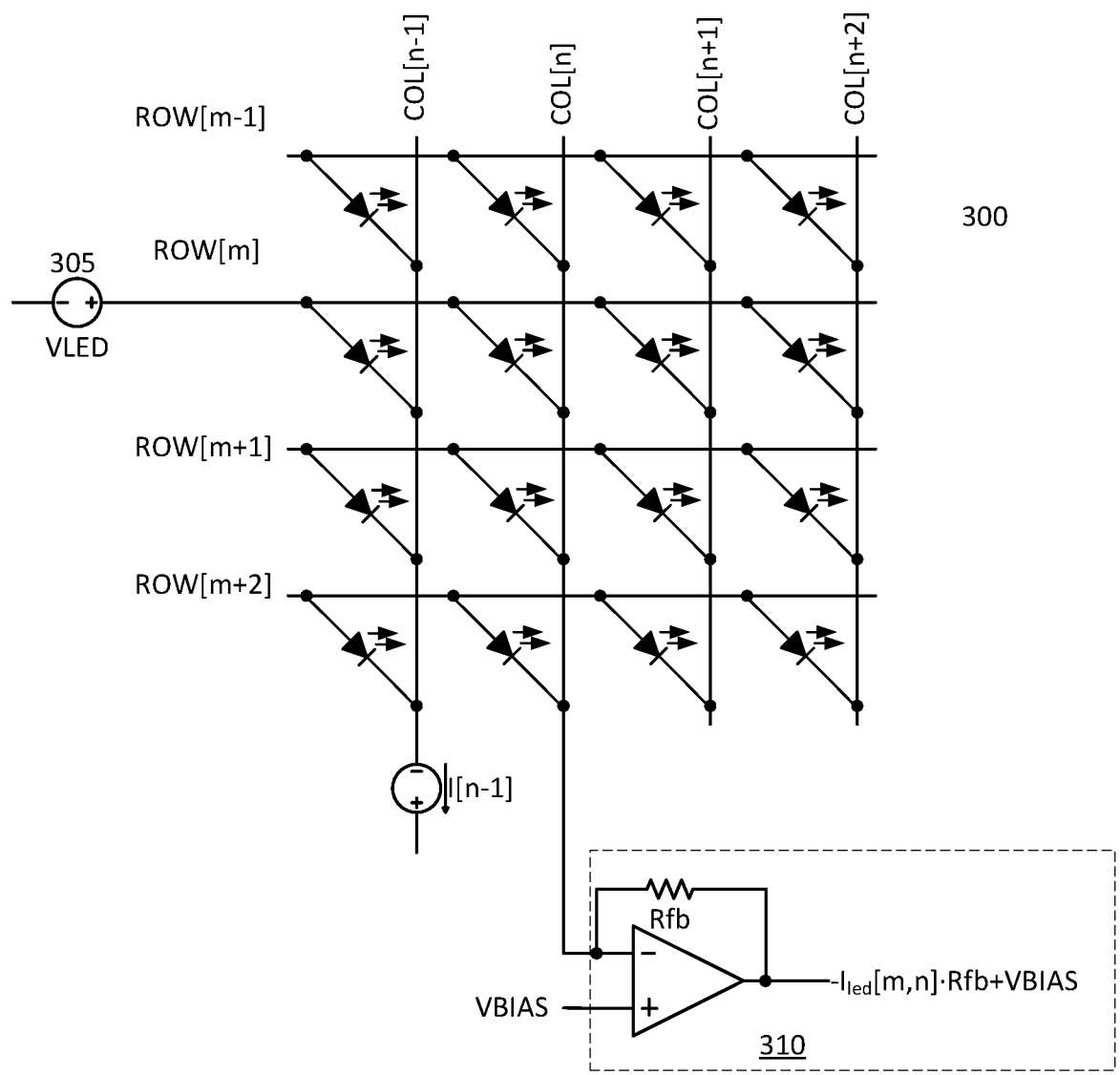
FIG. 3 shows a circuit diagram embodiment configured to enable activation of a single LED pixel element [m, n−1] in an emission state and activation of a single pixel element [m, n] in a photo-diode, or photo-sensing state.

FIG. 3 shows a circuit diagram embodiment configured to enable activation of a single LED pixel element in an emission state and activation of a single pixel element in a photo-diode, or photo-sensing state. As shown in FIG. 3, a portion 300 of an LED display includes a 4×4 array of LED pixel elements defined by four rows, ROW[m−1] to ROW[m+2], and four columns, COL[n−1] to COL[n+2]. Portion 300 may be located anywhere in the LED display, e.g., in a corner of the display, at an edge of the display or anywhere in an interior portion of the display. In this example, a single column, COL[n−1], is connected to a current sink, I[n−1], and a single row, ROW[m], is driven by a voltage source 305 configured to provide a voltage, including a voltage at a level sufficient to forward bias an LED pixel element, VLED. In an embodiment, the voltage source is connected to the anode of the LED pixel element and the current measurement circuit is coupled to cathode of the LED pixel element. Also, as shown, a single column, COL[n], is connected to a current measurement circuit 310 biased to VBIAS, where VBIAS is at VLED or above. It should be appreciated that the current measurement circuit bias VBIAS may be slightly below VLED, e.g., at a level below VLED, but sufficiently high that the LED pixel at ROW[m], COL[n] does not turn on. The other rows, ROW[m−1], ROW[m+1] and ROW[m+2], are left unconnected. In this example, when driven at VLED, the LED pixel at ROW[m], COL[n−1] is activated in an emission state, e.g., emits light or turns on. Simultaneously, the LED pixel at ROW[m], COL[n] is activated in a photo-sensing state, e.g., absorbs and detects light impinging thereon and produces a current at the current measurement circuit 310.

It should be appreciated that although the columns and rows are shown as being orthogonal, different configurations may be implemented. For example, an array of display pixel elements may be orthogonal as shown in FIG. 3, or they array may be non-orthogonal, e.g., rows and columns intersect at an angle other than 90°, or may take on a different configuration as would be apparent to one skilled in the art.

In this example, the current measurement circuit 310 includes a trans-impedance amplifier referenced to VBIAS. The output voltage of current measurement circuit 310 in this embodiment is $V_{out}=-I_{LED}[m,n] \cdot Rfb+VBIAS$. It should also be understood that the LED being illuminated and the LED whose current is being measured need not be on adjacent columns. For example, the current measurement circuit may be connected to COL[n+1] or COL[n+2] (or another display column outside of the 4×4 array shown in FIG. 3), as the pixel element at ROW[m], COL[n−1] is turned on.

In an embodiment, multiple current measurement circuits may be implemented, e.g., more than one column may be attached to a current measurement circuit similar to or identical to circuit 310 to enable activating other LED pixel element(s) in a photo-sensing state.

The FIG. 3 embodiment is useful, for example, in a LED display array using a raster scanned methodology, where typically only one LED may be activated or lit up at a time. This raster scanned methodology is a degenerate version of a row scanned methodology as will be shown in FIG. 4.

Figure 4:
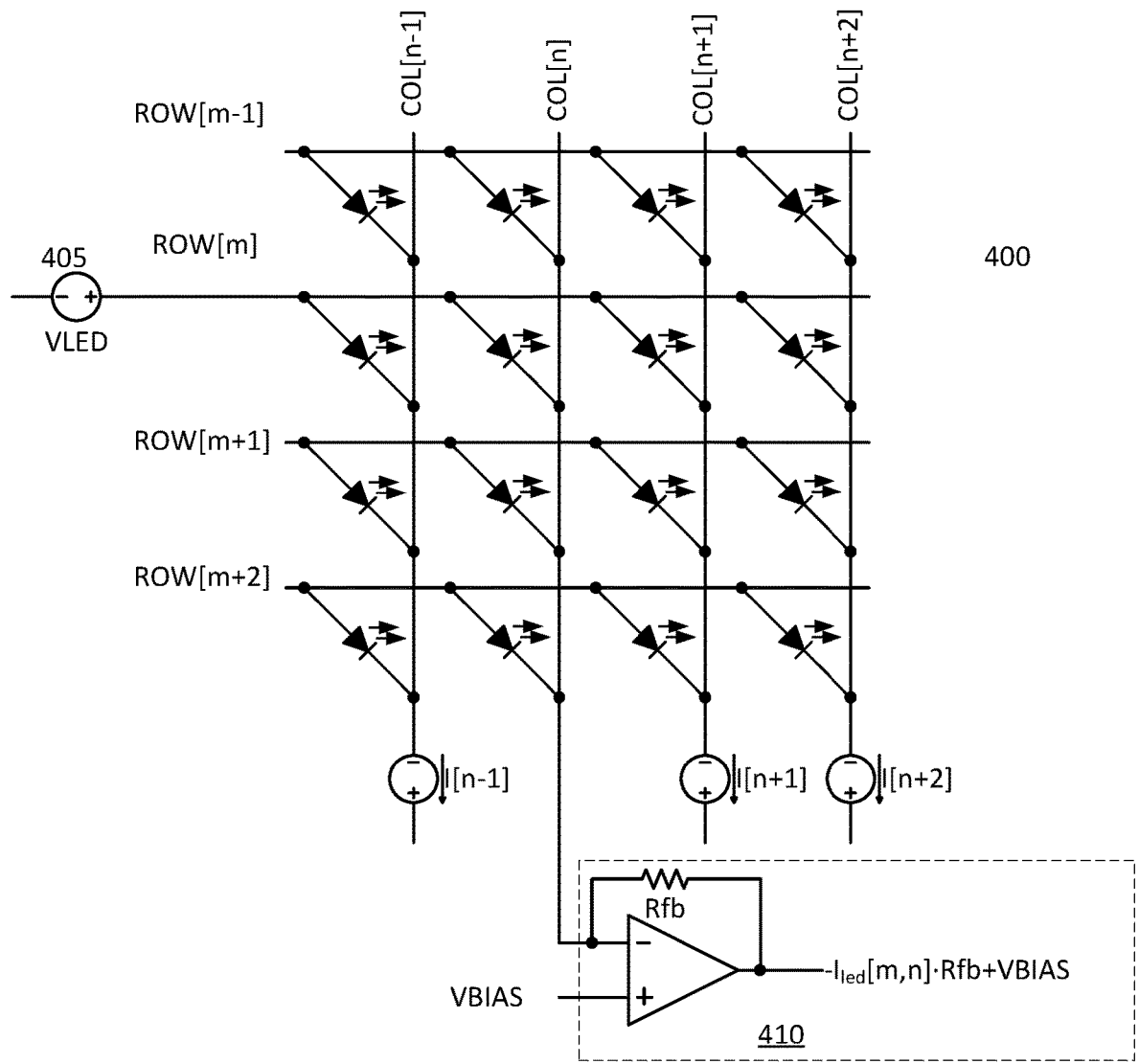
FIG. 4 shows a circuit diagram embodiment configured to enable activation of a row of LED pixel elements in an emission state and activation of a single pixel element in a photo-diode, or photo-sensing state.

FIG. 4 shows a circuit diagram embodiment configured to enable activation of a row of LED pixel elements in an emission state and activation of a single pixel element in a photo-diode, or photo-sensing state. As shown in FIG. 4, a portion 400 of an LED display includes a 4×4 array of LED pixel elements defined by four rows, ROW[m−1] to ROW[m+2], and four columns, COL[n−1] to COL[n+2]. Portion 400 may be located anywhere in the LED display, e.g., in a corner of the display, at an edge of the display or anywhere in an interior portion of the display. In this example, a single column, COL[n−1], is connected to a current sink, I[n−1], and a single row, ROW[m], is driven by a voltage source 405 configured to provide a voltage, including a voltage at a level sufficient to forward bias an LED pixel element, VLED. In an embodiment, the voltage source is connected to the anode of the LED pixel element and the current measurement circuit is coupled to cathode of the LED pixel element. In this example, when driven at VLED, the LED pixels along ROW[m] are activated in an emission state, e.g., emits light or turns on. The other rows, ROW[m−1], ROW[m+1] and ROW[m+2], are left unconnected. To detect or measure light, at least one column is connected to a current measurement circuit biased at VBIAS. In the example shown in FIG. 4, a single column, COL[n], is connected to a current measurement circuit 410 biased to VBIAS. In this configuration, the LED pixel at ROW[m], COL[n] is activated in a photo-sensing state, e.g., detects light impinging thereon and produces a current at the current measurement circuit 410. It should be appreciated that the current measurement circuit bias VBIAS may be slightly below VLED, or at VLED, but sufficiently high that the LED pixel at ROW[m], COL[n] does not turn on. Typically, VBIAS will be at VLED or above.

In this example, the current measurement circuit 410 includes a trans-impedance amplifier referenced to VBIAS. The output voltage of current measurement circuit 410 in this embodiment is Vout=−$I_{LED}$[m,n]·Rfb+VBIAS.

In the example embodiment shown in FIG. 4, multiple current sinks are connected to multiple rows, so an entire row of LED's may be turned on simultaneously. To measure light, at least one column is connected to a current measurement circuit 410 biased at VBIAS. In an embodiment, multiple LED pixel elements in ROW[m] may be simultaneously connected to current measurement circuits, e.g., circuits similar to or identical to circuit 410. For example, a second current measurement circuit may be connected to COL[n+2] (or another display column outside of the 4×4 array shown in FIG. 3) so that the LED pixel at ROW[m], COL[n+2] is also activated in a photo-sensing state when the remaining pixel elements along ROW[m] are turned on.

Figure 5A:
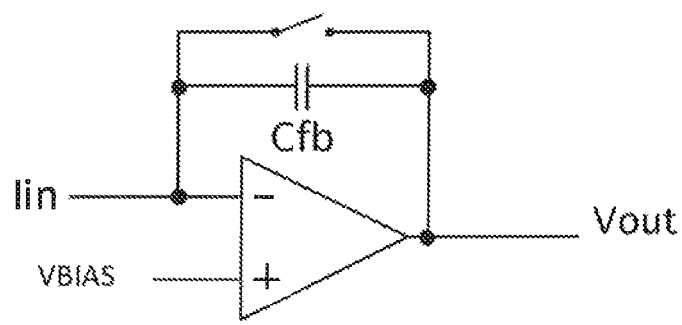
FIGS. 5A, 5B and 5C show useful current measurement circuits according to various embodiments.
Figure 5B:
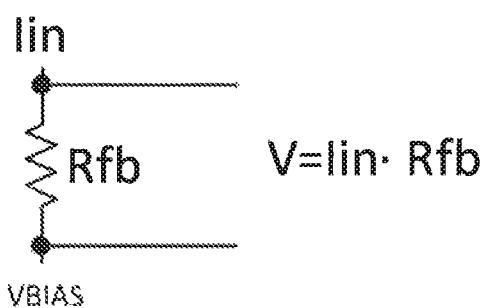
Figure 5C:
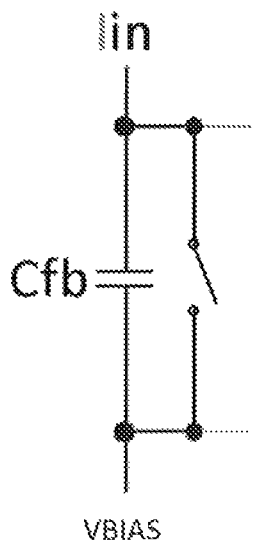

FIGS. 5A-C show other useful current measurement circuits according to various embodiments.

FIG. 5A shows a switched capacitor charge integrator, where $$Vout = -\frac{1}{c_{fb}} \int_o^\tau I_{in} dt.$$

FIG. 5B shows a circuit, including a resistor, that produces a differential voltage measurement.

FIG. 5C shows a switched capacitor arrangement that provides a voltage measurement, where $$\Delta Vout = -\frac{1}{c_{fb}} \int_o^\tau I_{in} dt.$$

Each of the current measurement circuits shown in FIGS. 5A, 5B and 5C, or others, such as a current conveyor circuit, may be used in any embodiment herein, e.g., in place of current measurement circuit 310, 410, as will be understood by one skilled in the art.

Often, LED displays, such as OLED displays, use a per-pixel current source made up of thin film transistors (TFTs) and which is on almost continuously. TFT transistors are typically only available as PFETs and have no substrate contact.

FIG. 6 shows an example of a two-transistor, one capacitor (2T1C) OLED pixel element 600. FIG. 7 is a circuit diagram embodiment including an array of 2T1C OLED pixel elements 600 shown in FIG. 6. The circuit embodiment in FIG. 7 as shown is configured to enable activation of a single OLED pixel element in a photo-diode, or photo-sensing state. To operate a single pixel element 600, the current source is typically programmed with the voltage on the "Data" line when the Select ("SEL") line is low. For example, a controller (not shown) may select a single pixel element in an array of pixel elements using the SEL line by applying the appropriate voltage to the SEL line to turn on its transistor T1, and when T1 is on, the controller applies an appropriate voltage on the Data line for that pixel to program a voltage on the gate of transistor T2.

To use a pixel element 600 as a photodiode, e.g., in a photo-sensing mode, transistor T2 is turned on, e.g., by dropping the OLED bias voltage to zero or negative, and the other transistors on that column are turned off. This is accomplished, in an embodiment, by adding a separate cathode line per column, for example Column n (corresponding to DATA[n] column) as shown in FIG. 7; the LED's on that column may be used as photodiodes. However, in this configuration all the LED's on that column are turned off. For example, to measure the photodiode current on LED [m,n], T2[m,n] should be turned on and the other T2 transistors on column n turned off. During a regular display update, such as during a blanking interval (HBlank or VBlank interval), for example, T2[m,n] may be programmed with a low voltage, turning it on, and the other T2 transistors may be programmed with VLED, turning them off.

Other TFT pixel drive circuits may use more than 2 transistors; FIG. 8, panels (a) and (b) show examples of two different TFT drive circuit configurations; these pixel elements may also be modified in a similar fashion as above to measure the photo-current from an LED pixel element that has low, zero or negative bias on it.

FIG. 9 illustrates a circuit embodiment configured to enable activation of one or more LED pixel elements in an emission state while using one or more LED pixel elements in a photo-diode or photo-sensing state. As shown in FIG. 9, a portion 900 of an LED display includes a 3×3 array of LED pixel elements defined by three rows, SEL[m−1] to SEL[m+1], and three columns, DATA[n−1] to DATA[n+1]. Portion 900 may be located anywhere in the LED display, e.g., in a corner of the display, at an edge of the display or anywhere in an interior portion of the display. In this example, a single column, DATA[n], is connected to an LED control circuit 910. In an embodiment, each column may include a DATA line (e.g., DATA[n]) and a SENSE line (e.g., SENSE[n]) connected to the LED control circuit as shown in FIG. 9. This circuit arrangement allows LED's in a column to remain on while one or more are used as photodiodes.

FIG. 10 shows a unit LED pixel element in detail; each LED pixel element includes 4 transistors (T1 to T4) and a capacitor (C1) configured as shown. The drain of transistor T3 is connected to the SENSE line and to a first switch (SW1), which is connectable to a first current to voltage converter (U1) in a photodiode mode and to a second current to voltage converter (U2) in a LED mode. The source of T1 is connected to the DATA line and to a second switch (SW2), which is connectable to the output of a third current to voltage converter (U3) as shown. The gate of transistor T1 is connected to SEL[m] and the gate of transistor T4 is connected to SEL[m]_bar.

In operation, when SEL[m] is set to low and SEL[m]_bar is set to high, transistors T1 and T3 act as a closed switches and transistor T4 as an open switch. Switches SW1 and SW2 are ganged together. In LED mode (e.g., position down as shown), the cathode of the LED is connected to U2 which acts as a virtual ground at VSS and a current to voltage converter. U3 then acts to set the voltage on the gate of T2 so the current through the LED is such that $I_{led} \cdot R_{fb}$+VSS=VDAC. When SEL[m] is set to high (e.g., turning off transistor T2) the voltage set by U3 is captured by capacitor C1. Furthermore, T4 now closes, redirecting the LED current directly into VSS.

With switches SW1 and SW2 in "Photodiode" mode as shown, the current from the LED going into current to voltage converter U1 acts as a virtual ground to VBIAS. Furthermore, the gate of T2 is driven to VON, which is set to a value to turn transistor T2 on. The LED now has zero bias current across it and acts as a photodiode (e.g., in a photo-sensing mode) The output of U1 is Vout=Iled·Rsense+ VBIAS.

Current to voltage converters U1 and U2 both have the same function, but U1 acts as a virtual ground at VBIAS and U2 acts as a virtual ground as VSS. These voltages, VBIAS and VSS, are different in an embodiment. By using separate amplifiers, U1 and U2 each may be optimized for their expected range of operation. In an embodiment, U1 and U2 may be replaced by a single amplifier.

FIG. 11 illustrates a circuit embodiment configured to measure a photo-current from an LED using a capacitor charge/discharge technique. In this embodiment, a capacitor C2 connected in parallel with the LED as shown is precharged to a known voltage (which may be 0V) and the photo-current from the LED accumulates on the capacitor. The voltage or charge on the capacitor may be measured. Vout, in the photodiode or photo-sensing mode as shown is given by Vout=-($Q_{LED}$/Csense)+VBIAS. This embodiment has the advantage of changing the gain by changing the length of time the photo-current for multiple LED pixel elements is integrated.

In FIG. 11, the SEL[m] signal and the state of the first and second switches, SW1 and SW2, respectively, are used to program the LED current or discharge the integrating capacitor C2. The discharge also measures the charge on capacitor C2. During normal operation, the LIGHT[m] signal is asserted (e.g., driven low) in order to turn the LED on.

In some embodiments, it is advantageous to maintain all of the transistors on the high-side of the LED such that the cathodes of all the LEDs are always connected to the same substrate. FIG. 12 illustrates a circuit embodiment that enables setting the LED light current and measuring the photo-charge on the high-side. Vout, in the photodiode or photo-sensing mode as shown is given by Vout=-($Q_{LED}$/Csense)+VSS. Note that LIGHT[m] may be the inverse of SEL[m] in an embodiment.

FIG. 13 illustrates a method of operating a display device according to an embodiment. In step 1001, one or more display pixel elements in an array of display pixel elements are activated to emit light. For example, a single display pixel element, or a portion of a row of display pixel elements may be activated to emit light. In step 1002, one or more other display pixel elements are simultaneously activated to detect light, e.g., operate in a photo-sensing state. For example, one or more display pixel elements in the row of activated (light emitting) display pixel elements may be activated to sense light. In step 1003, the output of the one or more other display pixel elements is measured, e.g., to produce output signals representing an amount of light detected. In step 1004, the output signals are processed. For example, processing the output signals may include determining an image, such as a fingerprint or partial fingerprint image, and performing authentication and/or other functions.

One skilled in the art will understand that the various transistor elements described herein may include PFET elements or NFET elements. For example, the above circuit embodiments are all shown as having a voltage source connecting to the anode of an LED pixel element and measuring the current at the cathode. One skilled in the art will understand that the connections may be swapped such that the voltage source connects to the cathode and the anode current is measured.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of operating a display, the display comprising a plurality of light-emitting diode (LED) pixel elements arranged in an array having a plurality of columns and a plurality of rows, the method comprising:
   selectively activating a first LED pixel element to emit light, wherein the first LED pixel element is in a first column of the plurality of columns, wherein the first LED pixel element is the only LED in the first column activated to emit light; and simultaneously
   activating a second LED pixel element to detect light, wherein the second LED pixel element is in a second column of the plurality of columns, and wherein the second LED pixel element is in a same row as the first LED pixel element, wherein the second column is a column non-adjacent to the first column, wherein the selectively activating the first LED pixel element includes driving the same row at a voltage sufficient to turn on the first LED pixel element with only the first column connected to a current sink, and wherein the activating the second LED pixel element includes connecting only the second column of the plurality of columns to a current measurement circuit.

2. The method of claim 1, further including measuring a current of the second LED pixel using the current measurement circuit.

3. The method of claim 1, wherein the current measurement circuit includes a trans-impedance amplifier having a first input connected to a bias voltage (VBIAS) and a second input coupled to an output of the second LED pixel element.

4. The method of claim 3, wherein the output of the second LED pixel element is a cathode of the second LED pixel element.

5. The method of claim 1, wherein the current measurement circuit includes one of a switched capacitor charge integrator, or a switched capacitor arrangement.

6. The method of claim 1, further comprising simultaneously with activating the first LED pixel element, activating multiple other LED pixel elements to emit light, wherein the multiple other LED pixel elements are arranged in the same row as the first LED pixel element and the second LED pixel element.

7. The method of claim 1, wherein the plurality of LED pixel elements comprises one of a plurality of LEDs, a plurality of OLEDs or a plurality of μLEDs.

8. A display device, comprising:
a plurality of light-emitting diode (LED) pixel elements arranged in an array having a plurality of columns and a plurality of rows, wherein a first LED pixel element is in a first column of the plurality of columns, wherein a second LED pixel element is in a second column of the plurality of columns and in a same row as the first LED pixel element, wherein the second column is a column non-adjacent to the first column;
a current sink;
a current measurement circuit; and
a control circuit configured to:
selectively activate the first LED pixel element to emit light by driving the same row at a voltage sufficient to turn on the first LED pixel element with only the first column connected to the current sink, wherein the first LED pixel element is the only LED in the first column activated to emit light; and simultaneously
activate the second LED pixel element to light by connecting only the second column of the plurality of columns to the current measurement circuit.

9. The display device of claim 8, wherein the current measurement circuit includes a trans-impedance amplifier having a resistor element (R), a first input connected to a bias voltage (VBIAS) and a second input coupled to an output of the second LED pixel element, and wherein an output of the current measurement circuit is Vout=$-I_{LED} \cdot R+$VBIAS, where $I_{LED}$ is the current of the second LED.

10. The display device of claim 9, wherein the output of the second LED pixel element is a cathode of the second LED pixel element.

11. The display device of claim 8, wherein the current measurement circuit includes one of a switched capacitor charge integrator, or a switched capacitor arrangement.

12. The display device of claim 8, wherein the control circuit is further configured to, simultaneously with activating the first LED pixel element, activate multiple other LED pixel elements to emit light, wherein the multiple other LED pixel elements are arranged in the same row as the first LED pixel element and the second LED pixel element.

13. The display device of claim 8, wherein the plurality of LED pixel elements comprises one of a plurality of LEDs, a plurality of OLEDs or a plurality of μLEDs.

14. A non-transitory computer-readable medium having processor-executable instructions stored thereon for operating a display device having a plurality of light-emitting diode (LED) pixel elements arranged in an array having a plurality of columns and a plurality of rows, the processor-executable instructions, when executed by a processor, enable display driver circuitry elements of the processor to:
selectively activate a first LED pixel element to emit light, wherein the first LED pixel element is in a first column of the plurality of columns, wherein the first LED pixel element is the only LED in the first column activated to emit light; and simultaneously
activate a second LED pixel element to detect light, wherein the second LED pixel element is in a second column of the plurality of columns, and wherein the second LED pixel element is in a same row as the first LED pixel element, wherein the second column is a column non-adjacent to the first column,
wherein the selectively activate the first LED pixel element includes driving the same row at a voltage sufficient to turn on the first LED pixel element with only the first column connected to a current sink, and
wherein the activate the second LED pixel element includes connecting only the second column of the plurality of columns to a current measurement circuit.

* * * * *